Aug. 15, 1939.    T. W. BUTTNER    2,169,404
METHOD OF PRODUCING LENSES
Filed May 28, 1937    2 Sheets-Sheet 2

INVENTOR.
Theodore W. Buttner.
BY
ATTORNEYS.

Patented Aug. 15, 1939

2,169,404

UNITED STATES PATENT OFFICE 2,169,404

METHOD OF PRODUCING LENSES

Theodore W. Buttner, Columbus, Ohio, assignor to Robinson-Houchin Optical Company, Columbus, Ohio, a corporation of Ohio Application May 28, 1937, Serial No. 145,354

3 Claims. (Cl. 49—82.1)

My invention relates to method of producing lenses. It has to do, more particularly, with a method for producing a lens for goggles, masks, etc., which embodies two single lenses of suitable shape having their edges fused together and having the space between the lenses evacuated. More specifically, this invention relates to the steps of producing a proper vacuum in the space between the single lenses and fusing the edges of the lenses together in such a manner as to seal such space so that the vacuum will be maintained. However, it is to be understood that my invention is not necessarily limited to this particular type of lens and, in fact, certain features of my invention are not limited to the production of lenses but may be employed in producing other articles.

In my co-pending application, Serial No. 129,877, filed March 9, 1937, I disclose a lens for goggles, masks, etc., to which this present invention is particularly adaptable. Such lens embodies two members of concavo-convex form, or other suitable form, which are so disposed that a space is formed therebetween. These lenses have their edges fused together and the space between the lenses is evacuated. The vacuum space serves to prevent fogging of the lenses, as disclosed in said application.

The present invention deals with a method which is particularly useful for producing a lens of the type disclosed in my co-pending application. In producing such lens, it is desirable to evacuate the space between the single lenses as completely as possible and it is desirable to seal such space without losing the vacuum by fusing the lenses together at the point where their edges contact. I have provided a suitable method for evacuating such space and for fusing the edges of the lenses together and then for annealing the composite lens. The method is simple, efficient and can be performed quickly and easily. The apparatus which I preferably use is simple and efficient and can be operated economically. Both the method and the apparatus lend themselves readily to mass production methods.

In performing my method, the single lenses are first molded or otherwise formed to the required shape. If surfaces are to be ground on the lenses, such surfaces are preferably first produced. Then the two cooperating single lenses are placed with their edges in contact on a suitable support in an electric furnace of novel form which I provide. The heating chamber of this furnace is connected to vacuum mercury condensation and rotary pumps so that the entire chamber may be evacuated. Means is provided for bringing the furnace chamber to a predetermined temperature. The furnace chamber is heated to such a temperature that the lens will be heated to a desired temperature below its melting point so as to bake-out gas, moisture and other substances in the space between the two lenses. When the furnace reaches such a temerature, the furnace chamber is evacuated so that all the air, gas, moisture, etc., will be drawn from the space between the two single lenses between the edges of the lenses and finally from the furnace chamber. The preliminary heating step is very important because it renders possible the removal of moisture, gases and other substances, which could not be evacuated from the space otherwise. Thus, this preliminary heating step makes it possible to produce a more effective vacuum. In this preliminary heating step the temperature of the lenses is always kept below the melting point of the material of the lenses so that the lenses will not be distorted and their edges will not fuse together. It is necessary for the edges to remain free from each other until the evacuation is completed inasmuch as the air is withdrawn from the space between the lenses at the joint where the edges contact with each other.

When the space between the two lenses is completely evacuated, the edges of the lenses may be fused together in order to hermetically seal said space and to maintain the vacuum. The heating chamber of the furnace is, consequently, provided with a heating means which is disposed in closely surrounding relationship to the cooperating edges of the two single lenses. This heating means is of such a nature that the edges of the lenses may be brought to an exceedingly high temperature for a comparatively short period. The heating means is so arranged that the lenses will be heated only at a point directly adjacent their edges. Since the heating element merely operates for a comparatively short period, the heat will not be imparted to the body portion of the lenses to cause distortion thereof. The composite lens is then annealed by gradually bringing the temperature of the furnace chamber down to a predetermined degree.

The apparatus which I preferably use in performing my method is illustrated in the accompanying drawings wherein similar characters of reference designate corresponding parts and wherein.

Figure 1:
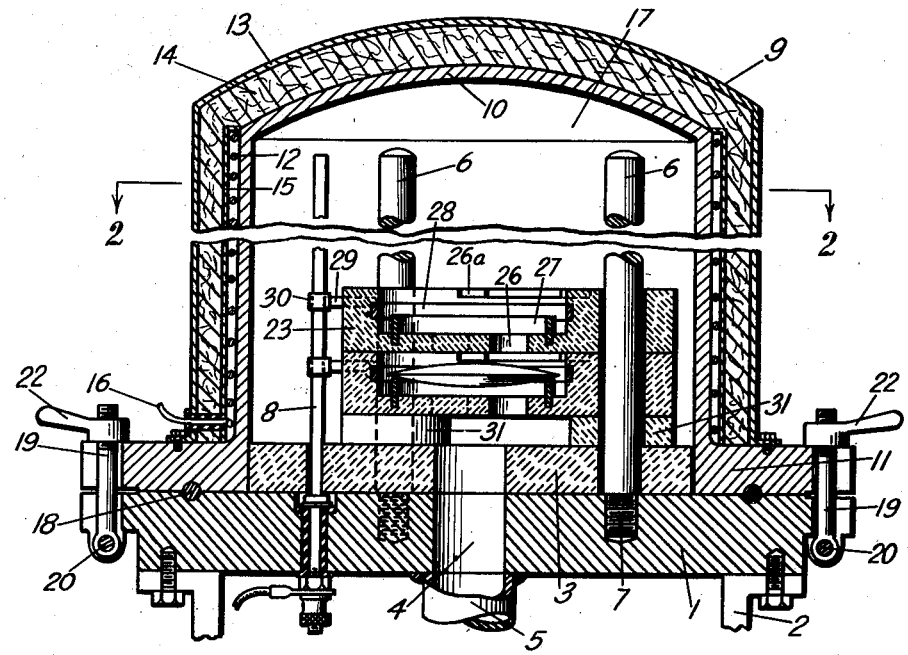
Figure 1 is a vertical section taken through a furnace made in accordance with my invention.
Figure 2:
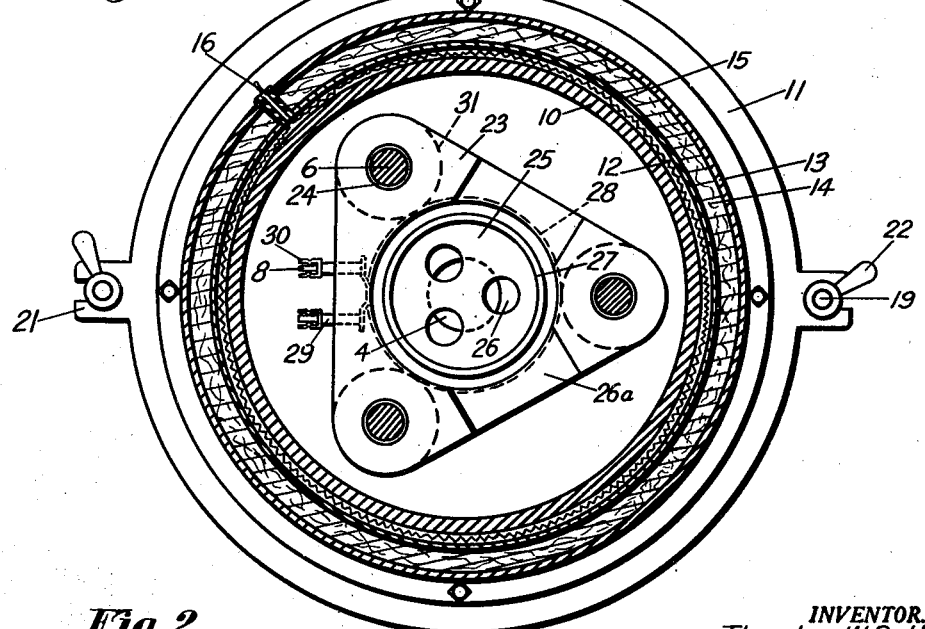
Figure 2 is a section taken substantially on line 2—2 of Figure 1.

With reference to the drawings, I have illustrated a furnace comprising a comparatively heavy base 1 which may be made of metal and which is secured to any suitable supports illustrated in part at 2. The base 1 is preferably of disk form. A disk 3 of refractory material is disposed on the upper surface of the base 1. This disk 3 is of less diameter than the base 1. A passageway 4 extends through the base 1 and the disk 3. The outer end of this passageway is connected to a conduit 5. The conduit 5 leads to evacuating mercury condensation and rotary pumps (not shown) which may be of any suitable height. The base 1 is provided with three upstanding pins 6 which are suitably spaced, as shown in Figure 2, although two, or more than three, may be provided, if desired. These pins 6 pass through openings in the disk 3 and are threaded into sockets formed in the base 1 as indicated at 7. A pair of electrodes 8 also project upwardly from the base substantially the same distance as the pin 6. One of the electrodes 8 may pass upwardly through the base 1 and be insulated therefrom (Figure 1), while the other may be grounded to the base merely by being threaded thereinto and thus avoid the necessity of passing both electrodes through the base. However, both may pass through the base and be insulated therefrom, in the manner illustrated in Figure 1.

The cover or dome 9 of the furnace is adapted to be positioned on the base 1. This dome 9 embodies an inner shell 10 which is preferably made of stainless steel and has its interior surface highly polished so that it will reflect the heat inwardly. The lower end of the shell 10 is provided with an outwardly projecting flange 11 which is adapted to rest on the upper surface of the base 1. It is apparent that the lower end of the dome surrounds the disk 3. An electric heating element 12 is disposed in surrounding relation to the shell 10. An outer shell 13 is disposed in spaced relationship to the shell 10 so as to form a chamber in which insulating material 14 is placed. A wall 15 separates the chamber in which the heating element is disposed from the chamber in which the insulating material is disposed. Suitable lines 16 lead to the heating element, as indicated.

Thus, it will be apparent that a heating chamber 17 is formed above the base 1 within the dome-like cover 9. This chamber is in communication with the vacuum pumps by means of the passageway 4. In order to effectively seal the joint between the dome-like cover 9 and the base 1, a ring 18 of aluminum or other relatively soft metal may be provided. The base 1 is provided with a plurality of bolts 19 which are pivoted thereto as at 20. These bolts are adapted to be swung upwardly between outwardly projecting lugs 21 formed on the periphery of the flange 11. Handle nuts 22 are threaded on the ends of the bolts 19. By swinging the bolts 19 into operative position and tightening the nuts 22, the dome-like cover 9 may be tightly clamped on the base 1. Thus, the dome will be tightly held in position. However, it may be completely removed from the base quickly and easily by loosening nuts 22 and swinging the bolts 19 downwardly into inoperative position.

Figure 3:
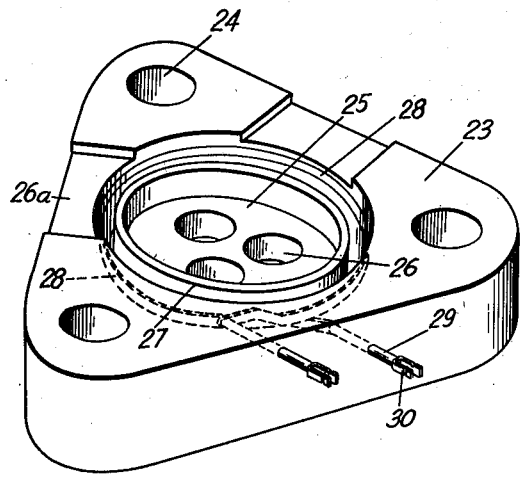
Figure 3 is a perspective view of a rack for holding one of the double lenses.
Figure 4:
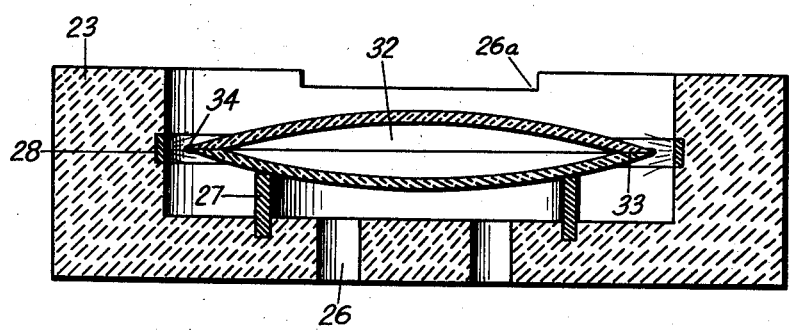
Figure 4 is a vertical section taken through the member illustrated in Figure 3 and showing a lens in position therein.

For supporting each of the double lenses to be evacuated and fused, I provide a rack 23 of the type illustrated in Figures 3 and 4. This rack 23 is preferably made of refractory material and is preferably of triangular shape as illustrated. It is provided with an opening 24 at each apex which are adapted to cooperate with the pins 6 which project up from the base 1. A substantially cylindrical socket or chamber 25 is formed in the member 23. This chamber 25 is completely open at its top in order to permit insertion of the lens. The bottom of the chamber is provided with a plurality of apertures 26. An upstanding annular supporting ring 27 is provided on the bottom of the chamber 25 and the lens is adapted to rest on this support, as indicated in Figure 4. An annular electric resistance element 28 is provided in the wall of chamber 25 at a level which will correspond with the level of the contacting edges of the two single lenses as will be apparent from Figure 4. The chamber 25 is preferably just slightly larger in diameter than the double lens in order that the heating element 28 will be closely adjacent the edge of said lens. Contact members 29, which are connected to element 28, project outwardly from one side of the member 23. These contact members are provided with yokes 30 on their outer ends. The upper edge of the member 23 is notched at 26a to permit heat to reach the interior of the chamber 25 even though several of these racks are piled upon each other.

Any number of these racks 23 may be provided depending upon the size of the furnace. The lens is placed in a rack in the manner illustrated in Figure 4. The dome is removed from the furnace and then each rack is positioned in the furnace. Each rack is positioned in the furnace by positioning it on the pins 6. Simultaneously with positioning the racks in the furnace, the yokes 30 of contact members 29 are caused to grip the electrodes 8. The yokes will resiliently but firmly grip the electrodes. Thus, merely positioning each rack in the furnace will automatically connect the heating element 28 thereof to the source of current. Any suitable number of racks 23 may be superimposed as illustrated in Figure 1. Spacers 31 are preferably provided around the pin 6 and rest on disk 3 for the purpose of maintaining the lowermost racks in spaced relation to the disk 3. Because I provide the notches 26a and the apertures 26 in the racks, free circulation of heat will be permitted and removal of air from the chambers in the various racks will be facilitated.

The heating element 12 is provided for bringing the temperature of the furnace chamber 17 to a predetermined point. The heating element 28, however, is preferably of such a type that it may be brought to a comparatively high temperature instantaneously so as to produce intense heat for an instant. In other words, it preferably produces a flash of heat. However, it is to be understood that instead of using resistant heating elements, I may employ inductive or high-frequency heating. For example, the dome of the heating and vacuum chamber may be made from a non-magnetic material and suitable heating elements may be placed on the inside of the chamber. In this way the elements may be heated by inductance or high frequency.

As disclosed in my prior co-pending application, the two single lenses are firs shaped and ground. They may be of concavo-convex form, as illustrated in Figure 4, or may be of any other suitable form. The two single lenses are positioned so that they face each other and a space 32 is formed between the two lenses. The edges contact with each other as at 33. The edges need not be of the particular shape shown but it is desirable that they come to a point or feather edge, as indicated at 34. If formed in this manner, fusion is facilitated.

A double lens is placed in each of the racks 23 in the manner illustrated in Figure 4 with their edges in contact with each other. The racks are then mounted on the base of the furnace and the dome is positioned on the base. The nuts 22 are adjusted so that the joint between the base and the dome of the furnace is tightly sealed. The heating element 12 is then turned on so that it will heat the interior chamber 17 to the proper temperature.

If the lenses are made of crown glass, it is desirable to bring the temperature of the chamber 17 up to such a point as the lenses in the racks 23 will be at a temperature of from 800 to 900 degrees F. It is desirable to heat the lenses to such a temperature that all moisture, gas and other substances in the space 32 between the lenses will be baked out. However, it is important to keep this temperature below the melting point of the glass of the lenses so as not to cause distortion thereof.

When the lenses reach the desired temperature, the vacuum pumps are started in order to evacuate the heating chamber 17, the chambers 25 in the racks, and the spaces 32 between the lenses. The temperature is maintained substantially constant during this evacuation operation. The heat will freely circulate through the various racks and the air may be effectively withdrawn from the chambers in the various racks. The air and other fluids will be withdrawn from the spaces 32 outwardly through the joints 33 between the contacting edges of the lenses and will finally be withdrawn from the furnace. This evacuation is carried out until a vacuum as complete as possible is produced in each space 32.

It is important to preliminarily heat the lenses to a desired temperature before evacuating and to maintain them at such temperature during the evacuation. This preliminary heating will bake out gas, moisture and other substances so that they may be readily withdrawn from the spaces 32. By removing moisture and other substances from the space 32, it is possible to obtain a more complete vacuum. However, as previously pointed out, the temperature in the preliminary heating step should not be raised to such a point as to cause fusion of the edges of the lenses, inasmuch as it is necessary to evacuate the spaces 32 before the edges of the lenses are fused.

The next step is to fuse the edges of the lenses together. It is desirable that this fusing operation be carried out in such a manner that the edges only of the lenses are heated so as not to cause distortion of the entire lens. This is accomplished by supplying the heating element 28 with current for a short interval. The heating element is of such a nature that it will produce an exceedingly high temperature instantaneously. It will produce a flash of heat which will be sufficient to cause fusion of the edge of the lenses together. For example, if the lenses are of crown glass, the edges may be heated to a temperature of from 1800 to 2500° F. However, since the heating element is only operative for an instant and it is disposed closely adjacent the contacting edges of the lenses, only the edges of the lenses will be heated and the heat will not be imparted to the body portion of the lenses. Thus, distortion of the lenses is prevented. As indicated in Figure 4, the flash of heat will cause the feather edge of the two lenses to fuse together. This will effectively seal the space 32 and the vacuum therein can be maintained. When the edges are fused, the composite lens is annealed by bringing the temperature of the heating chamber of the furnace gradually down to a predetermined degree, by controlling the outer heating element 12. Then the finished lens may be removed from the furnace.

It will be apparent that with my method the space between the two single lenses will be effectively evacuated. It is preferable to evacuate this space to such an extent that a very low vacuum will be produced, for example, as low as 0.2 of a micron. With my method and apparatus, it will be possible to do this. Furthermore, with my method the space will be effectively sealed. The method which I have devised makes it possible to evacuate the space and fuse the edges of the lenses to seal it, quickly, efficiently, and economically. Because the furnace chamber is free from air during the heating and fusing of the lens, there will be no oxidation in such chamber and, consequently, there will be no chance of oxidation harming the finished surfaces of the lens. Furthermore, this may be accomplished without the use of highly skilled labor. The method is of such a nature that it may be used in mass production of the lenses.

It will be apparent that this invention is applicable to the production of lenses from glass and from other plastic material which is capable of being fused in the manner indicated.

Although I have described my invention as being particularly applicable to the production of lenses of the type indicated, it is to be understood that it is not limited to the production of lenses. My method and apparatus may be used in evacuating and sealing any hollow objects which are capable of being fused in the manner indicated.

Various other objects and advantages will be apparent from the preceding description, the drawings and the following claims.

Having thus described my invention, what I claim is:

1. The method of making a lens of the type described which comprises placing two individual lenses together which are of such shape that they form a space therebetween and which contact with each other at their edges, only, heating the lenses to a predetermined temperature below their melting point, evacuating the space between said lenses while they are maintained at the predetermined temperature, and then heating the edges only of the lenses to cause the edges to fuse together without causing distortion of the body portion of the lenses.

2. The method of making a lens of the type described which comprises placing two individual lenses together which are of such a shape that they form a space therebetween and which contact with each other at their edges only, placing the cooperating lenses in a furnace heating chamber, bringing the temperature of said furnace to a predetermined degree to heat the lenses to a predetermined degree below their melting point, evacuating the heating chamber so as to withdraw fluid from the space between the two lenses while they are maintained at the predetermined temperature, then subjecting the edges only of the lenses to a flash of heat to cause the edges to fuse together without causing distortion of the body portion of the lenses, and then gradually lowering the temperature of the heating chamber in order to anneal the composite lens.

3. The method of making a lens of the type described which comprises placing two individual lenses together which are of such a shape that they form a space therebetween and which contact with each other at their edges only, placing the cooperating lenses in a suitable chamber, bringing the temperature of said chamber to a predetermined degree to heat the lenses to a predetermined degree below their melting point, evacuating said chamber while the lenses are hot so as to withdraw fluid from the space between the lenses, and then subjecting the edges only of the lenses to intense heat for a comparatively short interval to cause the edges only to be heated to a temperature above the melting point of the material thereof so as to cause the edges to fuse together without causing distortion of the body portions of the lenses.

THEODORE W. BUTTNER.